United States Patent [19]
Giles

[11] Patent Number: 5,995,255
[45] Date of Patent: Nov. 30, 1999

[54] CONCATENATED FIBER GRATING OPTICAL MONITOR

[75] Inventor: Clinton Randy Giles, Morganville Township, Monmouth County, N.J.

[73] Assignee: Lucent Technologies Inc., Murray Hill, N.J.

[21] Appl. No.: 08/959,354

[22] Filed: Oct. 28, 1997

[51] Int. Cl.[6] .................................................. H04J 14/02
[52] U.S. Cl. ..................... 359/124; 359/110; 359/182; 359/184; 356/419
[58] Field of Search .................................. 359/124, 130, 359/110, 187, 182, 184; 356/419

[56] References Cited

U.S. PATENT DOCUMENTS 5,850,292  12/1998  Braun ........................................ 356/419

OTHER PUBLICATIONS

Giles et al., "Concatenated Fiber Grating Optical Monitor", IEEE Photonics Technology Letters, vol. 10. pp. 1452–1454, Oct. 1998.

*Primary Examiner*—Kinfe-Michael Negash

[57] ABSTRACT

A Wavelength Division Multiplexing (WDM) optical monitor, based on concatenated fiber gratings, uses a single modulator and detector and has high dynamic range and good sensitivity through signal averaging. The WDM optical monitor may be implemented in a time-domain or frequency-domain embodiment and used for SNR measurement of WDM optical signals.

12 Claims, 5 Drawing Sheets

FREQUENCY-DOMAIN MONITORING

TIME-DOMAIN MONITORING

FREQUENCY-DOMAIN MONITORING

N BROADBAND GRATINGS

N SCANNED GRATINGS

2N STATIONARY GRATINGS

TIME-RESOLVED GRATING REFLECTION SPECTRA

2-GRATING REFLECTION TEST

HIGH-RESOLUTION 2-GRATING PULSE SPECTRUM (1555.98nm)

4-CHANNEL INPUT OPTICAL SPECTRUM ($T_{mfl}=16°C$)

GRATING REFLECTION SPECTRUM

CONCATENATED FIBER GRATING OPTICAL MONITOR

TECHNICAL FIELD OF THE INVENTION

This invention relates to Wavelength Division Multiplexing (WDM) systems and, more particularly, to an optical signal monitor for use with such systems.

BACKGROUND OF THE INVENTION

Progress in WDM networks is placing new requirements for optical monitoring of system performance and channel characteristics. Conventional grating spectrometers, wavemeters and scanning Fabry-Perot filters have been proposed for optical monitoring, but often are unsuitable because of cost, performance or reliability.

What is desired is a high performance, cost-effective optical signal monitor for use with WDM networks.

SUMMARY OF THE INVENTION

In accordance with the present invention, a new optical monitor spectrometer based on concatenated fiber Bragg gratings is disclosed that may be adapted in several configurations. The approach is complementary to that proposed for fiber Bragg grating Add/Drop and cross-connect circuits as described in the recently issued patent application of C. R. Giles and B. Glance, Ser. No. 08/730,282, entitled "Add/Drop circuit for a wavelength-Division Multiplexed Network", filed Oct. 15, 1996.

More particularly, a method and apparatus for a Wavelength division Multiplexed (WDM) optical signal monitor is disclosed comprising a modulator for modulating a received WDM signal with a first signal to produce a modulated WDM signal, an optical sampling means for receiving the modulated WDM signal and for generating therefrom a plurality of spatially separated wavelength signals, and a signal detector means for discriminating between a predefined characteristic of the first signal and the plurality of spatially separated wavelength signals.

In one embodiment the optical signal monitor provides for the monitoring of time-domain characteristics of the WDM input signal. In another embodiment the optical monitor provides for the monitoring of frequency-domain characteristics of the WDM input signal. The optical sampling means may be implemented using broadband stationary gratings for broadband channel monitoring of the WDM input signal or scanned gratings for high-resolution scanning of the WDM input signal. Oversampling of the WDM input signal channel spectrum by using more gratings than channels may be used to eliminate the need for scanning of the gratings. Signal averaging may also be used to improve performance of the optical signal monitor.

DETAILED DESCRIPTION

Shown in FIG. 1 is an illustrative block diagram of two configurations of an optical monitor spectrometer. The optical monitor spectrometer is based on concatenated fiber bragg gratings that may be adapted in several configurations. As noted, the approach is complementary to that proposed for fiber Bragg grating Add/Drop and cross-connect circuits described in my previously-referenced patent application.

Figure 1A:
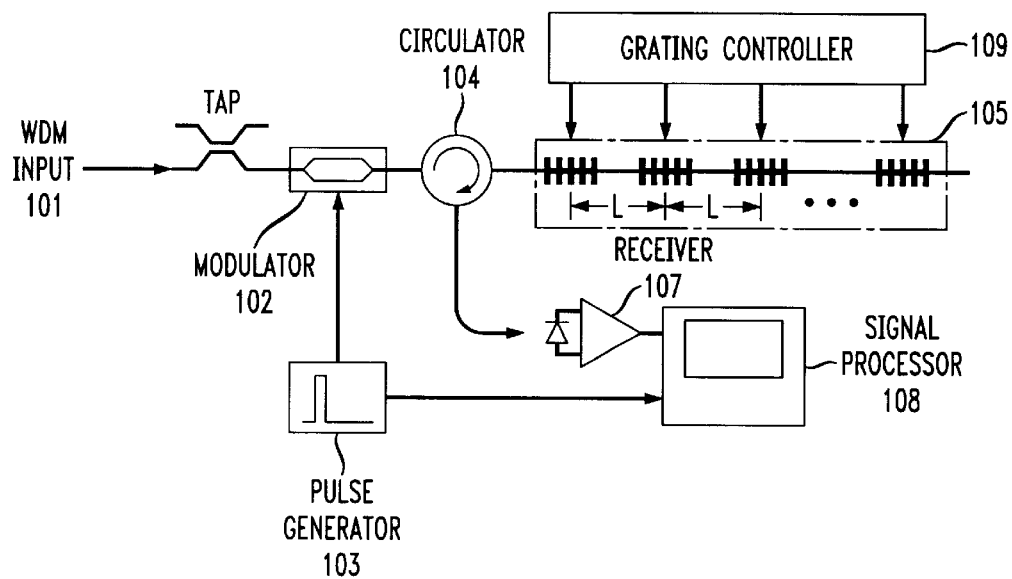
In FIG. 1a the optical monitor is used as a time-domain monitor and in FIG. 1b it is used as a frequency-domain monitor.

With reference to FIG. 1a, a time-domain optical monitor embodiment in accordance with the present invention is described. A Wavelength Division Multiplexed (WDM) input optical signal 101 to the optical monitor is pulse modulated in a polarization-independent modulator 102 at a low duty cycle using a pulsed signal from pulse generator 103. The pulse modulation is asynchronous to data carried on any of the WDM channels, of input signal 101, in order to obtain sample averaging. The pulses from the modulator 102 pass through an optical circulator 104 and are launched into an optical sampling means implemented as a series-connected array 105 of fiber Bragg gratings. The fiber Bragg gratings have a spacing, L, so that pulses reflected by the gratings are temporally separated when outputted from the circulator output port 106 and detected by receiver 107. For example, a spacing of the fiber-gratings of 2 meter apart results in 20 ns delay between adjacent reflected pulses. In this case, 5–10 ns duration modulation pulses should be readily discriminated at the receiver 107 and signal detector means (signal processor 108). The signal processor 108 receives the detected output signal from receiver 107 and pulse signals from generator 103 and processes them to determine a signal indicative of the power for each wavelength of the WDM input signal 103. Improved signal-to-noise with rapid data acquisition could also be obtained using sample averaging at signal processor 108.

More generally, using the above-described techniques the optical signal monitor of FIG. 1a may be used to determine one or more predefined characteristics of one or more wavelengths of the WDM input signal.

Figure 1B:
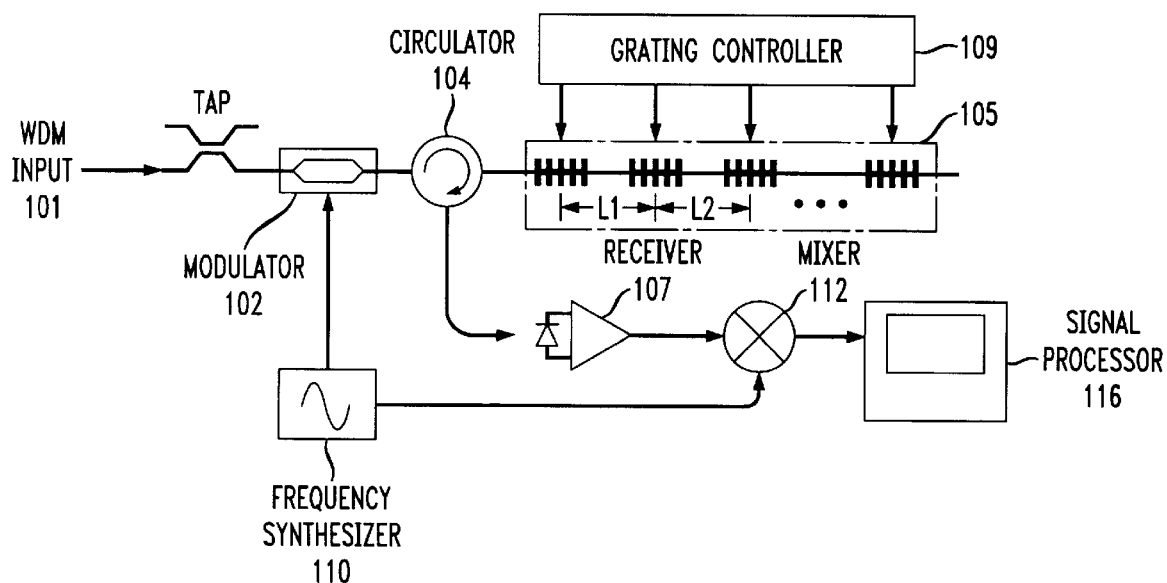
FIG. 1 shows illustrative block diagrams of an optical monitor in two configurations.

With reference to FIG. 1b, a frequency-domain optical monitor embodiment in accordance with the present invention is described. I have recognized that instead of measuring characteristics of the WDM input signal 101 in the time-domain, as in FIG. 1a, the input modulator could modulate the WDM input signal 101 using a sinusoidal modulation signal, from frequency synthesizer 110, as shown in FIG. 1b. The reflected modulated input signal is then outputted to signal detector 115, which includes mixer 112 and signal processor 116. In signal detector 115, the electrical mixer 112 receives the detected output signal from receiver 107 and sinusoidal modulation signals from frequency synthesizer 110 and phase-discriminates them. The signal processor 116 processes the discriminated signals from mixer 112 to determine a signal indicative of the power for each frequency (wavelength) of WDM input signal 103.

In one arrangement of FIG. 1b, the gratings are spaced at L1, L2, etc. so that a set of modulation frequencies can be chosen to produce quadrature mixing (maximum mixer output) of only one reflected channel for each frequency and null output for the rest of the channels.

Simultaneous modulation at all selected frequencies could be done, but may require high-speed signal processing after the receiver 107, rather than a simple mixer 112. The signal processor 116 of FIG. 1b could also provide improved signal-to-noise performance using sample averaging.

Using the above-described techniques the optical signal monitor of FIG. 1b may, more generally, be used to determine one or more predefined characteristics of one or more wavelengths of the WDM input signal.

Figure 2A:
FIG. 2 shows the grating configurations for (a) broadband channel monitoring, (b) high-resolution swept-grating scanning and (c) high-resolution stationary grating monitoring.
Figure 2B:
Figure 2C:

The choice of number of fiber Bragg gratings, in array 105, and their filter shape depends upon the application, three cases are illustrated in FIGS. 2a, 2b, and 2c. As shown in FIG. 2a, the optical monitors of FIG. 1a and 1b may be arranged for broadband channel monitoring, e.g., for simple power monitoring. In such an arrangement, the number of fiber Bragg gratings would equal the number of WDM channels, N, and each grating would have a rectangular-shaped reflection band with the bandwidth 201 equal to that assigned to the channel. The grating filter shapes are stationary and the power in each received pulse would be proportional to channel optical power. The received pulse for a given channel is reflected by its associated grating filter, exits the output 106 of circulator 104 and is detected at receiver 107.

When time-domain monitoring of the input WDM signal 101 is desired, then the optical monitor of FIG. 1a is used and the output signal from receiver and the pulse signal from generator 103 are processed and displayed by signal processor 108. When frequency-domain monitoring of the input WDM signal 101 is desired, then the optical monitor of FIG. 1b is used with sinusoidal modulation signals from frequency synthesizer 110. As previously described in FIG. 1b, the output signal from receiver 107 and sinusoidal modulation signals from frequency synthesizer 110 are processed and displayed by signal detector 115 to produce a signal indicative of the power for each frequency (wavelength) of WDM input signal 103.

With reference to FIG. 2b, the optical monitors of FIG. 1a and 1b may be arranged for high-resolution swept-grating scanning, e.g., the monitoring of detailed spectra of WDM input signal 101. In such an arrangement, detailed spectra of WDM input signal 101 could be resolved using N adjustable narrowband gratings, in grating array 105, which are adjusted or scanned over the signal band, e.g., 202–203, by changing the temperature of or strain on the grating(s). It should be noted that with dense channel spacing in the WDM input signal 101, fewer than N gratings may be used, since each grating may be scanned over more than one channel of the WDM input signal 101.

Signals from grating controller 109 are used to control the temperature of, or strain applied to, these narrowband gratings. In an optical monitor using these narrowband gratings, the reflected signals from the grating would vary as the frequency spectrum gratings are swept over.

In a time-domain optical monitor of FIG. 1a, the reflected signals would then be detected by receiver 107 and processed and displayed by signal processor 108. In a frequency-domain optical monitor of FIG. 1b, and in the manner similar to that previously described, the reflected signals would then be detected by receiver 107 and processed and displayed by signal detector 115.

With reference to FIG. 2c, the optical monitors of FIG. 1a and 1b may be arranged for high-resolution stationary grating monitoring. In one illustrative arrangement, 2N stationary gratings may be used, two for each channel—e.g., 1a and 1b for channel 1. When more gratings than channels are used, an oversampling of the received spectrum results which enables sufficient signal monitoring so as to eliminate the need for scanning the gratings. This is illustrated with the 2N grating filter plan shown in FIG. 2c where the channel wavelength can be interpolated from pulse power ratios.

In one illustrative FIG. 1a arrangement, five gratings were spliced together with an InGaAsP electroabsorption modulator, 102, at the input to the optical circulator 104. The modulation rate, from generator 103, was approximately 10 kHz with 15 ns pulses. The gratings had a spacing, L, between 185–280 cm apart in order to obtain well-resolved reflected pulses. The grating reflection bandwidths 201 were approximately 0.75 nm 3dB full bandwidth and nominally spaced for 0.8 nm (100 GHz) channel spacing 204. Two gratings overlapped as shown by 1a and 1b of FIG. 2c to test the ratiometric method of high-resolution channel monitoring.

Figure 3A:
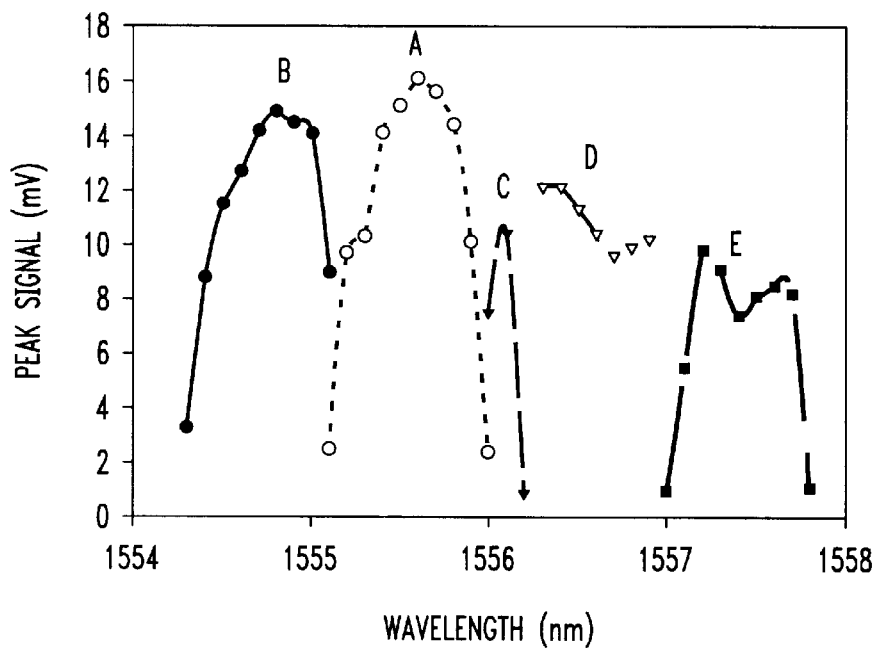
FIG. 3a shows an illustrative curve of the peak amplitude of the detected pulses reflected from the gratings, where a tunable single-frequency laser is used as the input to the modulator.
Figure 3B:
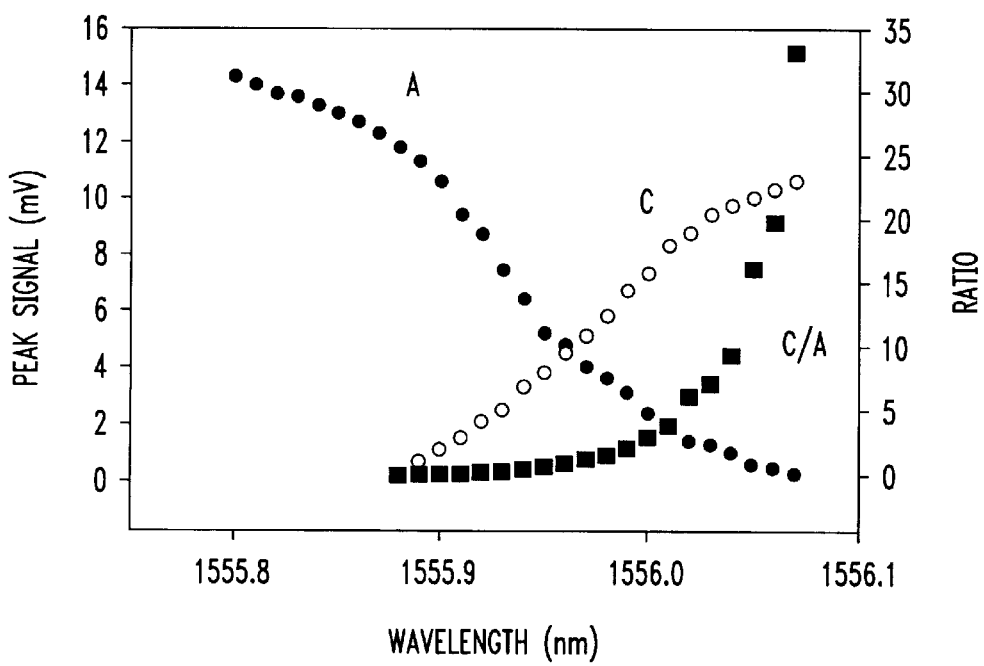
FIG. 3b shows an illustrative curve of the high resolution scanning of the tunable laser in the overlap region between gratings "A" and "C", together with the pulse amplitude ratio.

FIG. 3(a) shows the peak amplitude of the detected pulses reflected from the gratings, where a tunable single-frequency laser is used as the input 101 to the modulator 102. Grating "A" was closest to the circulator, grating "E" the furthest. The pulse amplitude spectra appear as those of the grating reflection spectra, with some increase in loss from splices and absorption at the longer wavelengths. High resolution scanning of the tunable laser in the overlap region between gratings "A" and "C" is shown in FIG. 3(b) together with the pulse amplitude ratio.

Figure 4:
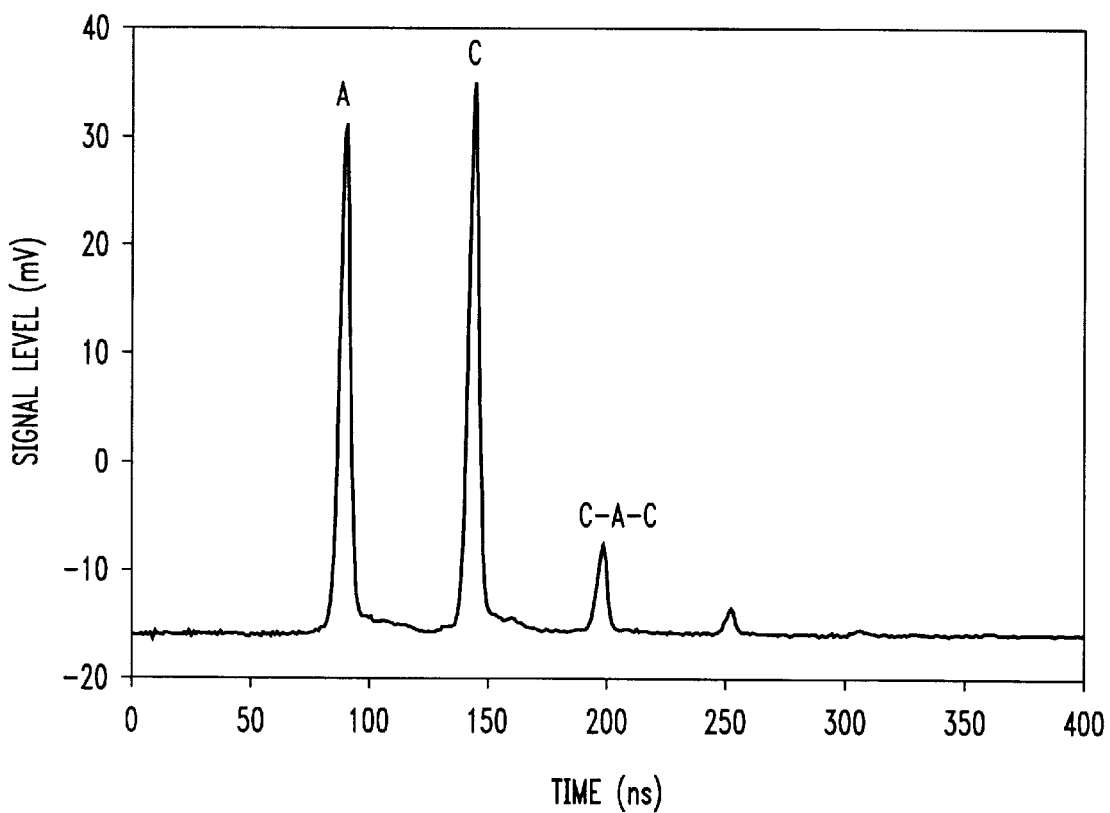
FIG. 4 shows an illustrative curve of a measured pulse response for an input wavelength of 1555.98 nm, showing multiply-reflected pulses following the single-reflection pulses.

FIG. 4 shows the measured pulse response for an input wavelength of 1555.98 nm, showing multiply-reflected pulses following the single-reflection pulses. In this ratiometric measurement, it appears that the channel frequency may be estimated to better than 0.01 nm accuracy in a 0.2 nm range. Better grating designs could improve the accuracy or measurement range.

Figure 5A:
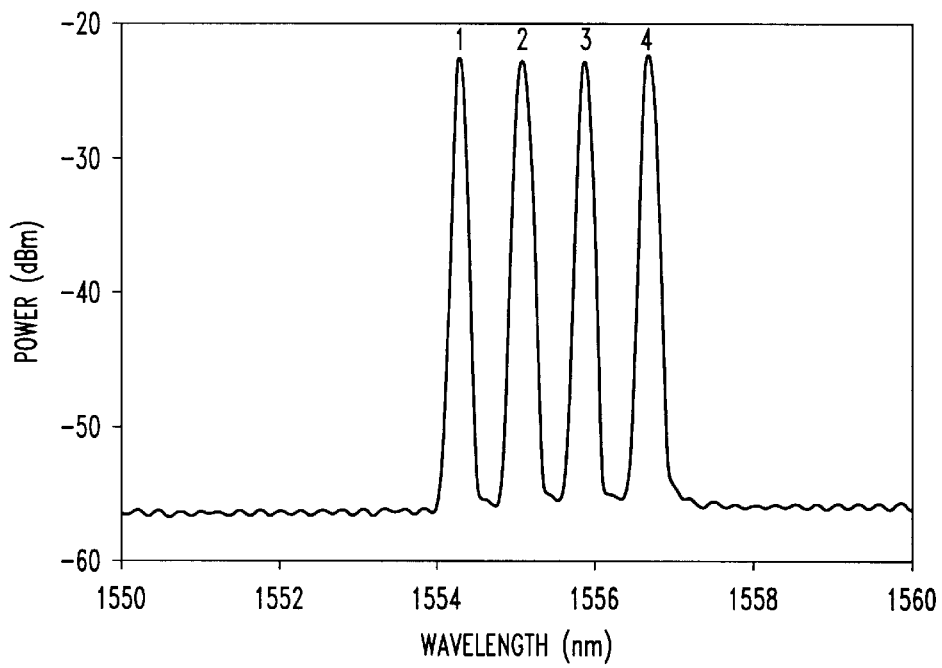
FIG. 5 shows an illustrative curve of a multifrequency laser's optical spectrum and the reflected pulse spectrum illustrating the potential for precise channel monitoring.
Figure 5B:
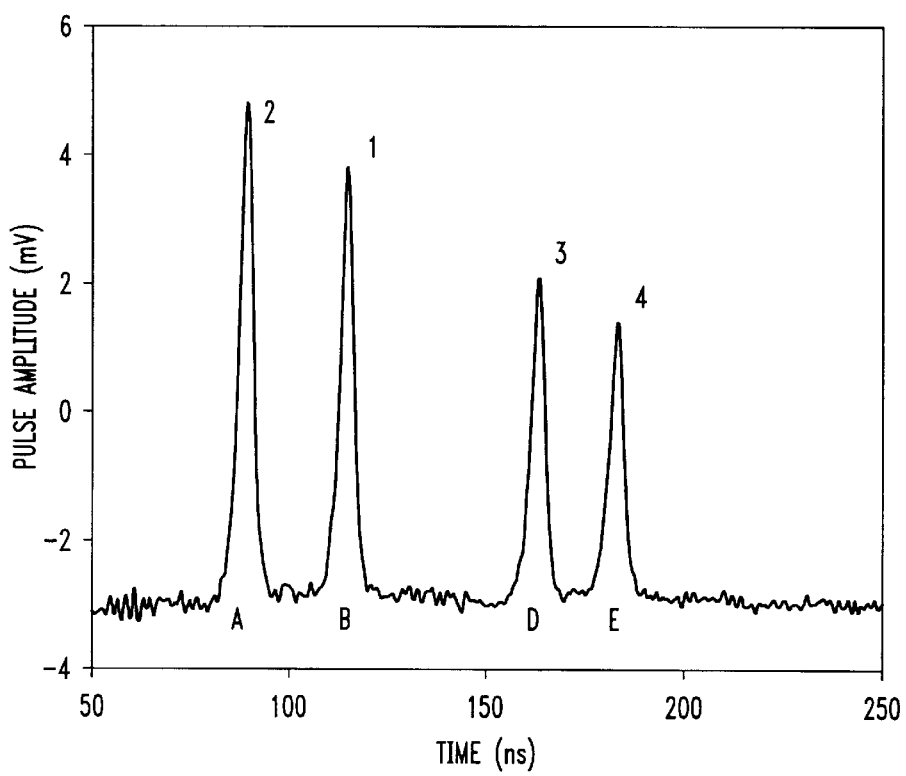

The optical monitor was tested using an integrated multifrequency laser emitting at four equal-power wavelengths having 100 GHz spacing, coinciding with gratings A, B, D and E. The multifrequency laser's optical spectrum and the reflected pulse spectrum in FIG. 5 shows the potential for precise channel monitoring. Higher losses for those pulses traversing through more gratings and splices are clearly seen in FIG. 5b, requiring then a one-time calibration of the optical monitor's pulse amplitude responses. As seen in FIG. 5, the gratings' positions were not sequentially ordered by wavelength, allowing the ordering to be optimized to accomodate excess losses in the grating chain. Additionally, the gratings do not have to be spaced uniformly allowing then for spurious effects, such as the multiple-reflections of FIG. 4, to occur without interfering with other signal pulses.

What has been described is merely illustrative of the application of the principles of the present invention. Other arrangements and methods can be implemented by those skilled in the art without departing from the spirit and scope of the present invention.

What is claimed:

1. A Wavelength Division Multiplexed (WDM) optical signal monitor comprising a modulator for modulating a received WDM input signal with a first signal to produce a modulated WDM signal, optical sampling means for receiving the modulated WDM signal and for generating therefrom a plurality of spatially separated wavelength signals, and signal detector means, responsive to the plurality of spatially separated wavelength signals and the first signal, for determining a predefined characteristic of one or more wavelengths of the plurality of spacially separated wavelength signals.

2. The WDM optical signal monitor of claim 1 wherein the modulator is a pulse modulator, the first signal is a pulse signal, and the signal detector temporally discriminates between the first signal and the spacially separated wavelength signals.

3. The WDM optical signal monitor of claim 1 wherein the modulator is a frequency modulator, the first signal is an analog optical frequency signal, and the signal detector includes a phase discriminator which discriminates between the phases of first signal and the spacially separated wavelength signals.

4. The WDM optical signal monitor of claim 1 being an optical power monitor wherein the signal detector further discriminates between the power levels of the spatially separated wavelength signals.

5. The WDM optical signal monitor of claim 1 wherein the optical sampling means includes a plurality N of fiber Bragg gratings, where N is equal to the number of optical signal channels in the WDM input signal.

6. The WDM optical signal monitor of claim 5 wherein at least one of the fiber Bragg gratings has a bandwidth which is about the same as the bandwidth of an optical signal channel of the WDM input signal.

7. The WDM optical signal monitor of claim 5 wherein the fiber Bragg gratings are spaced at L1, L2, etc. so that a set of modulation frequencies can be chosen to produce quadrature mixing to produce maximum mixer output at only one reflected optical signal channel of the WDM input signal for each frequency and null output for the rest of the channels.

8. The WDM optical signal monitor of claim 1 wherein the signal detector means uses sample averaging.

9. The WDM optical signal monitor of claim 1 wherein the optical sampling means includes a plurality of fiber Bragg gratings, each grating associated with a wavelength channel of the WDM input signal, where the bandwidth of at least one of the of the Bragg gratings is less than the bandwidth of its associated channel and wherein said at least one of the of the Bragg gratings is scanned substantially over a the bandwidth of its associated channel of the WDM input signal.

10. The WDM optical signal monitor of claim 9 wherein the at least one of the of the Bragg gratings is scanned by adjusting a Bragg grating characteristic selected from a group of characteristics including at least a temperature and a strain characteristic.

11. The WDM optical signal monitor of claim 1 wherein the optical sampling means includes a group of fiber Bragg gratings which exceed a plurality of wavelength channels of the WDM input signal, and wherein the group of gratings cover the bandwidth of the plurality of wavelength channels, wherein at least two gratings each form a reflected optical signal sample for one or more predetermined wavelength channel, and wherein said signal detector means, responsive to the reflected optical signal samples and the first signal, determines a predefined characteristic of the predetermined wavelength channel.

12. A method of monitoring optical wavelengths in an optical Wavelength Division Multiplexed (WDM) signal comprising the steps of modulating a received WDM signal with a first signal to produce a modulated WDM signal, sampling the received modulated WDM signal to obtain a plurality of spatially separated wavelength signals, and in response to the plurality of spatially separated wavelength signals and the first signal, determining a predefined characteristic of one or more wavelengths of the plurality of spatially separated wavelength signals.

* * * * *